United States Patent [19]
Rieder et al.

[11] Patent Number: 5,332,895
[45] Date of Patent: Jul. 26, 1994

[54] ANGLE ENCODER WITH INCREMENTAL AND ABSOLUTE TRACKS

[75] Inventors: Heinz Rieder, Oberndorf; Max Schwaiger, Ostermiething, both of Austria

[73] Assignee: RSF-Elektronik Gesellschaft m.b.H., Tarsdorf, Austria

[21] Appl. No.: 16,008

[22] Filed: Feb. 10, 1993

[30] Foreign Application Priority Data

Feb. 20, 1992 [AT] Austria ................................. 307/92

[51] Int. Cl.$^5$ ............................................. G01D 5/34
[52] U.S. Cl. .......................... 250/231.14; 250/231.18; 250/237 G
[58] Field of Search ....................... 250/231.14, 231.16, 250/231.17, 231.18, 237 G; 356/375

[56] References Cited

U.S. PATENT DOCUMENTS

| | | | |
|---|---|---|---|
| 3,689,160 | 9/1972 | Shimulenis et al. | 250/231.14 |
| 3,989,943 | 11/1976 | Campbell et al. | 250/231.15 |
| 4,606,642 | 8/1986 | Nelle | 250/237 G |
| 4,720,699 | 1/1988 | Smith | 250/231.18 |
| 5,235,181 | 8/1993 | Durana et al. | 250/237 G |
| 5,239,177 | 8/1993 | Cunniff | 250/231.18 |

FOREIGN PATENT DOCUMENTS

| | | |
|---|---|---|
| 2362731 | 6/1975 | Fed. Rep. of Germany . |
| 2351389 | 12/1977 | France . |
| 669457 | 3/1989 | Switzerland . |

*Primary Examiner*—David C. Nelms
*Attorney, Agent, or Firm*—Collard & Roe

[57] ABSTRACT

An angle encoder having bovine an incremental section and an absolute section and serving to detect angular positions of an encoder disk and the number of revolutions performed by said disk comprises an incremental measuring scale and an absolutely coded measuring scale provided on said disk and associated reading and evaluation means. In conjunction with a high angular resolution it is desired to determine any absolute position of the disk without a previous rotation of the disk. This is accomplished in that the encoder disk comprises in addition to an incremental scale an absolutely coded scale consisting of a serial bar code, from which multidigit code words are readable, which are associated with respective absolute angular positions of the disk. The absolutely coded measuring scale extends on a track that is radially offset from the incremental scale and comprises code bars having side edges which are radially aligned with the radial boundaries of the increments of the incremental scale. An associated reader consists of a multiline detector, which is adapted to detect a complete code word and has a pixel size that is adapted to the bar code. The evaluating unit determines an instantaneous position of the encoder disk in dependence on the signals generated in response to the scanning of both scales, and a counter is provided, which is independent of an external power source and serves to detect the number of revolutions which have been performed.

7 Claims, 2 Drawing Sheets

ANGLE ENCODER WITH INCREMENTAL AND ABSOLUTE TRACKS

BACKGROUND OF THE INVENTION

1. Field of the Invention

This invention relates to an angle encoder that serves to indicate angular positions of and the number of revolutions performed by an encoder disk and comprises incremental and absolutely coded measuring scales and associated reading means and evaluating means.

2. Description of the Prior Art

Angle encoders are used to detect angular positions of rotating or pivotally moving marts and to measure oath lengths; in the litter case the movement, e.g., the linear movement, of a sensor along a path is converted by a transducer to a rotary movement for driving the shaft of the angle encoder.

In addition to angle encoders of the kind described first hereinbefore, angle encoders are known in which the encoder disk is provided only with an absolutely coded scale.

If the angle encoders of the kind described first hereinbefore have encoder disks that have diameters which can be used in practice, e.g., of 30 or 50 mm, they can be used for a relatively high resolution of angles in dependence on the signals generated in response to the scanning of the incremental scale. To define the zero position of the encoder disk provided with the incremental scale, that encoder disk is provided with a reference mark, which must be scanned in addition to the measuring scale and the scanning of which results in the generation of a reference pulse, which synchronizes a counter, which is controlled by digital pulses derived from the signals generated in response to the scanning of the incremental scale. In response to a power failure or to a shutdown that counter is reset to zero or to a predetermined count by such reference pulse. To detect the number of revolutions performed by the encoder disk, such known encoders comprise two or more additional encoder disks, which are provided with an absolute scale, and associated reading means, which are connected by speed-reducing transmissions to each other and to the main encoder disk that is provided with the incremental scale. In the previous practice the absolute code consists of a multidigit code, which is printed on a corresponding number of circular tracks on the disk and may consist, e.g., of a gray code, and the reader extends radially of the disk and comprises scanning elements equal in number to the tracks. The resolution which can be achieved with such absolutely coded encoder disks is only a fractional part of the resolution which can be achieved by an incremental measuring apparatus. For this reason it is necessary for definite measurements to use transmissions having a relatively low speed reduction ratio, e.g., of 16:1, so that in case of disks which are 30 mm in diameter it is necessary for a detection of 1024 revolutions to provide in addition to the incrementally coded encoder disk three absolutely coded disks, the first and second of which are interconnected and connected to the main disk by transmissions having a speed reduction ratio of 16:1 and the third disk is connected to the second absolutely coded disk by a transmission having a speed reduction ratio of 4:1. The speed-reducing transmissions must be substantially free of backlash. Besides, in case of a shutdown or a power failure it will be necessary in the least favorable case to impart to the incrementally coded encoder disk almost an entire revolution until the reference pulse occurs before the absolute position of the encoder disk is again definitely defined. For this reason such angle encoders cannot be used in practice, e.g., for a direct coupling to robot arms because such angular movement of the part that is coupled to the angle encoder and consists, e.g., of a gripper moving in the interior of a hollow member would result in damage to the hollow member and to the robot. For this reason the known angle encoders used for such applications comprise an absolutely coded encoder disk so that only a much lower resolution can be achieved. The number of revolutions which are performed is again determined by absolutely coded disks, which are connected by speed-reducing transmissions.

CH-A-669,457 discloses a combined incremental and absolute measuring system for length measurements, in which the measuring scale is read by a multiline diode array, by which the illuminated scale is scanned by means of a magnifying optical system having an exactly defined magnification factor. The pixels of the array are provided with different charges in dependence on the distribution of bright and dark fields of the scale, which is provided with a bar code. In addition to the production of incremental countable signals it will be possible to effect an absolute measurement if bright and dark fields of the scale are interchanged so that the scale is additionally coded in a quasi-random form and individual scale sections are defined by different code words derived from the code. But in practice that length-measuring system has an insufficient resolution in the absolute range and difficulties are involved in an exact association of the absolute measurement with the incremental measurement. For the absolute measurement it is necessary to compare the charges of adjacent pixels of the array and to distinguish between the signals obtained from the absolute code and the signals required for an incremental measurement. Because that optical system is employed, even the slightest change of the distance from the reading unit to the measuring scale and slightest errors regarding the pitch of the scale will result in errors in the measurement. It must also be taken into account that an evaluation by which position signals are derived from the signals obtained from the absolute code will take a much longer time than the generation and evaluation of simple countable pulses generated in response to the incremental scanning of the measuring scale.

SUMMARY OF THE INVENTION

It is an object of the invention to provide an angle encoder which is of the kind described first hereinbefore and which is simple in design and has a high resolution and in which the absolute position of the encoder disk can exactly be defined even at the beginning of operations and after a shutdown or a power failure.

In an angle encoder of the kind described first hereinbefore that object is accomplished in that the encoder disk comprises in addition to an incremental scale an absolutely coded scale consisting of a serial bar code, from which multidigit code words are readable, which are associated with respective absolute angular positions of the disk, and an associated reader is provided, which consists of a multiline detector, which is adapted to detect a complete code word and consists particularly of an array of CCD chips or of diode lines having a pixel size that is adapted to the bar code, the absolutely coded measuring scale extends on a track that is radially offset from the incremental scale and comprises code bars having side edges which are radially aligned with the radial boundaries of the increments of the incremental scale, the evaluating unit determines an instantaneous position of the encoder disk in dependence on the signals generated in response to the scanning of both scales, and a counter is provided, which is independent of an external power source and serves to detect the number of revolutions which have been performed.

The resolution of such a measuring system is of the same order as the resolution of a strictly incremental measuring system, i.e., it is a multiple of the resolution of known absolutely encoded encoder disks. In a practical embodiment the resolution which can be achieved by the scanning of the bar code with the line detector may be of an order of, e.g., 20 micrometers. A resolution which is at least ten times higher can be achieved if the phase angles of the signals generated in response to the scanning of the incremental scale are detected for each position which is absolutely defined by the detected code word. As a result, any position and particularly any start position can be defined with adequate accuracy. If a serial code is employed, nested code words may be used or consecutive code words together with an associated start bit. If a nested serial code is used, the number of code words consisting each of a bar and a space may theoretically amount to $2^n$, where n is the number of pixels of the line detector. In case of a code provided with a start bit the position of the start bit relative to the line detector will be detected so that the instantaneous absolute position will be defined by the position of the code word relative to the line detector. The separation the two scale tracks simplifies the reading and permits a much more accurate reading and determination of the position in conjunction with reasonable tolerances as regards the accuracy of the measuring scale and the distance from the reading means.

The number of revolutions performed by the encoder disk can be determined by various methods. In any case it will be necessary to permit a detection of revolutions of the encoder disk even without a supply of external power to the counter.

For use in one of such methods the angle encoder comprises a second encoder disk provided with an absolutely coded scale and an associated reader, said second encoder disk is connected to the means for driving the first encoder disk by a speed-reducing transmission, the scale on the second encoder disk also comprises a serial bar code, and the associated reader is correspondingly designed.

Because the bar code provided in accordance with the invention permits a much higher resolution to be achieved, it will be sufficient in most cases to provide a single additional encoder disk if the interconnecting transmission has a sufficiently high speed reduction ratio. The reading accuracy may be increased in that the additional encoder disk is also provided with an incremental scale and an associated reader. To ensure that the second encoder disk will perform an appreciable angular movement in response to an angular movement of the first encoder disk, it is possible to use instead of a desired speed reduction ratio of, e.g., 4096:1 a ratio in which the value "1" has been replaced by a larger number by which 4096 can be divided, e.g., 27, so that the first and second encoder disks will have returned to absolutely identical positions after 4096 revolutions of the first encoder disk and 27 revolutions of the second encoder disk.

According to a further feature of the invention the coded measuring scale is adapted to be read by the associated reader by optoelectronic scanning methods and associated illuminating means are adapted to be instantaneously energized to produce a light flash only at the beginning of operations or after a shutdown or in response to an external demand so that the evaluation unit will then detect the instantaneous position and the further measurement or positioning can be effected with reference to said instantaneous position by an evaluation of the signals generated in response to the scanning of the incremental scale of the encoder disk. In that embodiment the start position is simply defined by the recording of the light flash and for the continued measurement it will be sufficient to evaluate the signals generated in response to the scanning of the incremental scale. The number of revolutions performed during a measuring operation can also be determined. Because the illuminating means are energized only for a short time, they may have a relatively short life and may consist, e.g., of laser diodes, which owing to the production of monochromatic light will be preferred for the scanning of the serially co ed scale. Besides, the signals generated by the angle encoder can readily be used in conjunction with control means which are inherently adapted to respond to incremental signals. Because a strictly incremental measurement is performed during the movement, the angle encoder may be operated even at high speed.

According to a preferred feature the encoder disk carries at least one element for actuating a bidirectional counter in dependence on the sense of rotation of the disk. This will further simplify the entire system.

According to a further feature the actuating element consists of an exciting element, which is mounted on the encoder disk at a distance from its axis of rotation and which associated with a receiver for delivering electric pulses without a need for a supply of external electric power, particularly for the generation of such pulses via a capacitive or magnetic link, in response to the movement of said element past said receiver, and the output of the said receiver is connected to a counting circuit, which is energized by a power source that is independent of the power mains and consists, e.g., of a button battery. In that case the count of the counting circuit will be preserved even in case of a failure of an external power source and any revolutions performed by the encoder disk during a failure of the external power source will also be counted. In such an embodiment a single encoder disk will be sufficient. The power source may be physically incorporated in the counting circuit or may easily replaceably be mounted in a central control unit.

According to a preferred feature the exciting element consists of an exciting magnet or set of exciting magnets associated with a receiver in which the Wiegand effect is employed. The use of a Wiegand receiver will afford the special advantage that the receiver does not require an external power supply and will generate a pulse in a highly exactly defined position of the exciting magnet relative to the receiver and the polarity of said pulse will depend on the direction of movement of the exciting magnet so that said pulses can easily be converted to signals for increasing and decreasing the count of the counter.

In special cases the encoder disk provided with the exciting magnet may be stopped in a position in which the exciting magnet is very close to the Wiegand receiver and may then be moved in the opposite direction. In that case defined signals can be obtained and a hysteresis of the switching points can be compensated or avoided if the encoder disk carries two exciting magnets, which are peripherally spaced apart. The position determined by the mean of the values represented by the two pulses which have been generated is defined as the zero position.

Further details and advantages of the invention will become apparent from the following description of the drawing.

DETAILED DESCRIPTION OF THE PREFERRED EMBODIMENT

Figure 1:
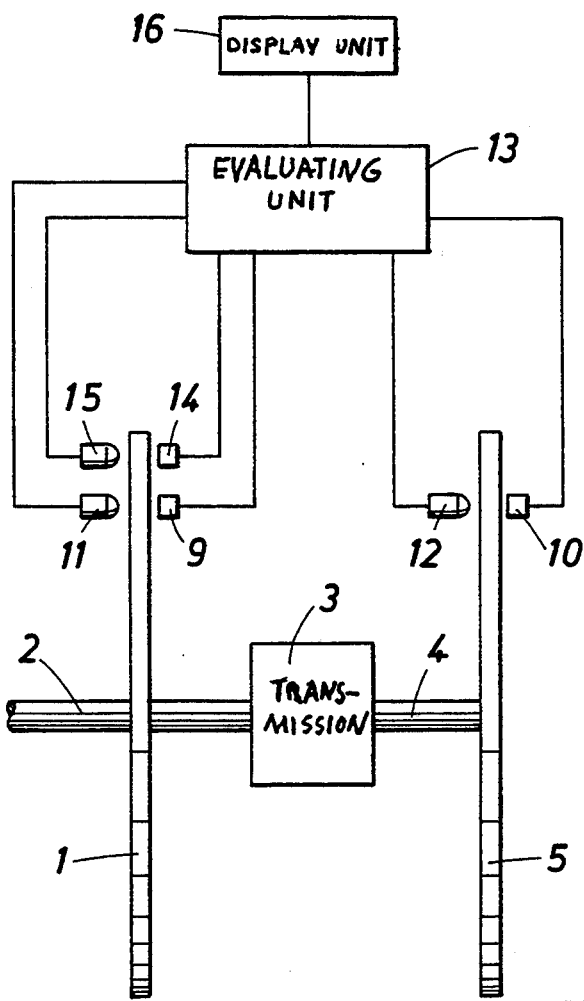
FIG. 1 is a highly schematic elevation showing an angle encoder in accordance with the invention.
Figure 2:
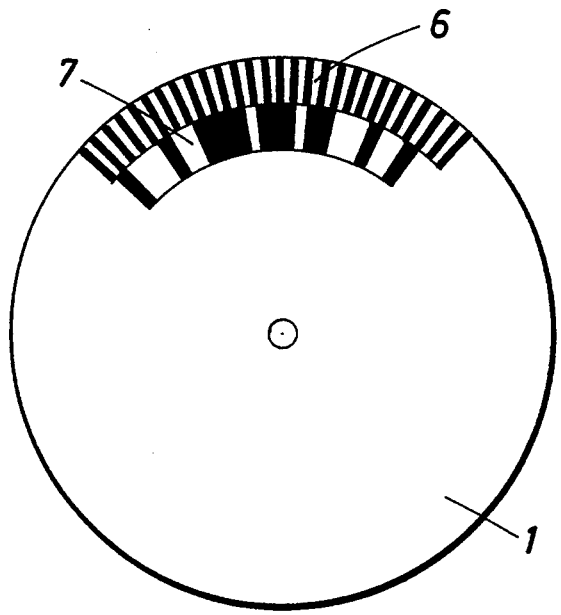
FIG. 2 shows the first encoder disk of the angle encoder of FIG. 1.
Figure 3:
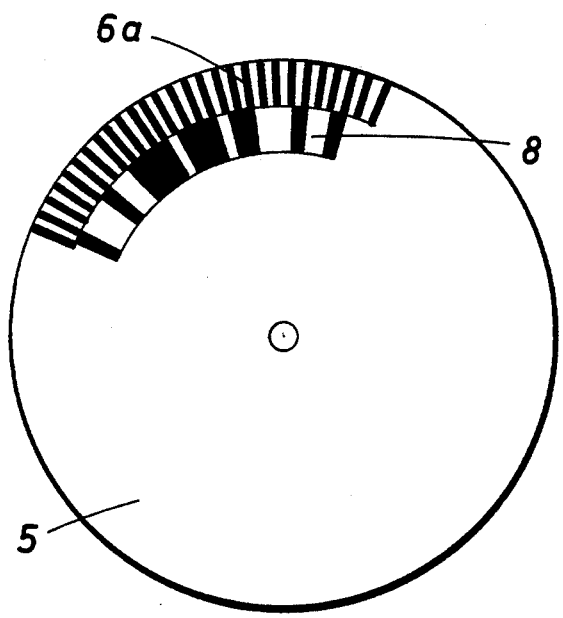
FIG. 3 shows the second encoder disk of FIG. 1.

The angle encoder shown in FIGS. 1 to 3 comprises a first encoder disk 1, which is adapted to be rotated by a drive shaft 2, which also drives a transmission 3, which has a very high speed reduction ratio, e.g., of 4096:1, and comprises an output shaft 4, to which a second encoder disk 5 is secured.

The first encoder disk 1 comprises an incremental measuring scale 6, which is disposed on a circular ring and consists of bars and spaces which are equal in size and which like the elements of a serial bar code arranged on a second circular track are shown in a greatly enlarged size. The basic pitch of the bar code 7 corresponds to the pitch of the incremental scale so that the radial boundaries of the fields of the incremental scale are radially aligned with the side edges of the bars of the serial bar code.

Another measuring scale consisting of a serial bar code 8 on a circular ring is provided on the second encoder disk 5.

The serial bar codes 7 and 8 are scanned by line detectors 9 and 10 having a line pitch which corresponds to the basic pitch of the codes 7 and 8, respectively. Said line detectors 9 and 10 are illuminated through the scales 7 and 8 by illuminating means 11 and 12, respectively, so that the line detectors 9 and 10 in response to the scanning of the scales 7 and 8 detect code words, which indicate the instantaneous position of the line detectors 9 and 10 relative to the disks 1 and 5, respectively. The signals generated by the line detectors 9 and 10 are delivered to a common evaluating unit 13. That evaluating unit 13 may be operated to turn on the illuminating means 11, 12 to produce respective light flashes only at the beginning of operations or after a failure of the supply voltage or in response to an external demand and may store the signals which are generated by the line detectors in response to said light flashes to indicate an initial absolute position. The movement from that initial absolute position is measured in that the incremental scale 6 is scanned by associated scanning means 14, with which at least one light source 15 is associated.

The scanning means 14 may also consist of a line detector or in a manner known per se the incremental scale 6 may be scanned by means of scanning gratings, which are offset from each other by an integral multiple and fractional parts of a scale increment, and photodetectors, which are associated with said gratings and generate relatively phase-displaced signals, which are dependent on the sense of rotation. If the initial position is detected in dependence on the phase relation of said signals, said initial position can be detected much more accurately than is possible by a scanning of the absolute scale 7. The position dependent signals which are generated in response to the scanning of the incremental scale 6 during the further movement may be processed in multiplier circuits or arithmetic units for an electronic further subdivision of the scale and the resulting signals may be delivered to the evaluating unit 13. The result of the measurement may be displayed by a display unit 16, which succeeds the evaluating unit 13. Alternatively, the signals from the evaluating unit may be delivered to a control unit. As is indicated in FIG. 3 the second encoder disk 5 may also be provided with an incremental scale 6a and scanning and illuminating means, not shown, which correspond to the means 14 and 15, respectively, may be associated with said incremental scale 6a and need not be operated to emit light continuously.

The accuracy with which the serial bar code 8 is read can be improved in that the incremental scale 6a is scanned at the same time as the serial bar code 8 in the manner described hereinbefore with reference to the first encoder disk 1.

Figure 4:
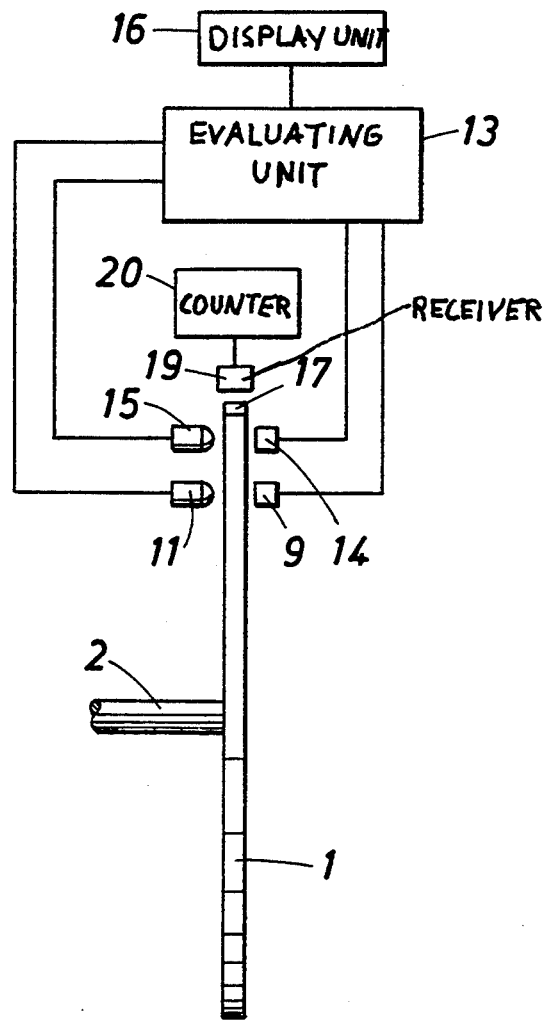
FIG. 4 is a view that is similar to FIG. 1 and shows another embodiment of the angle encoder.
Figure 5:
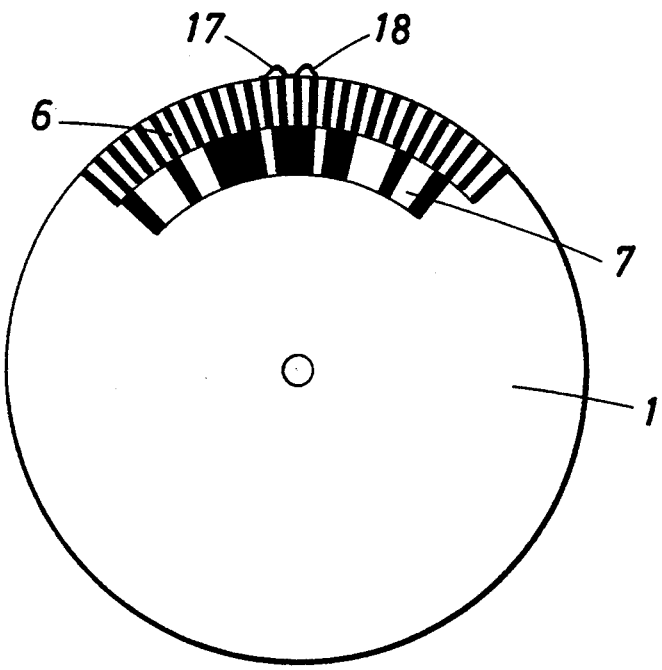
FIG. 5 is an elevation showing the encoder disk of that angle encoder.

In the embodiment shown in FIGS. 4 and 5 the design of the first encoder disk and its measuring scales 6 and 7 and the means for evaluating the posit on-dependent signals are similar to the corresponding means shown in FIGS. 1 to 3 and like parts are designated by the same reference characters.

A difference from the embodiment shown in FIGS. 1 to 3 resides in that the second encoder disk 5 has been omitted and the encoder disk 1 is provided on a portion of its periphery with two peripherally spaced apart exciting magnets 17 and 18, which during each revolution of the encoder disk 1 successively enter the range of a Wiegand receiver 19, which in response to the passing of each magnet 17 or 18 generates signals having a polarity that depends on the sense of rotation. Said signals are delivered to a separate counter 20, which is provided with a separate power source, such as a button battery or a storage battery and is connected to the evaluating unit 13. The instantaneous count of the counter 20 indicates the number of revolutions performed by the encoder disk from an assumed or defined zero position. The counter 20 might be integrated in the evaluating means 13. The separate power source for the counter 20 may be physically incorporated in the counter itself or in the evaluating means 13.

We claim:

1. An angle encoder for detecting angular positions of a rotatably mounted encoder disk of the angle encoder and the number of revolutions of the disk upon rotation thereof, wherein the encoder disk comprises an incremental scale extending on a first circular track and comprising increments having radial boundaries, and an absolutely coded scale extending on a second circular track radially spaced from the first track and comprising a serial bar code having radial side edges radially aligned with said radial boundaries and representing multi-digit code words corresponding to absolute positions of the encoder disk, the angle encoder further comprising (a) reading means for scanning the incremental scale and the absolutely coded scale and for generating position-dependent signals in response to the scanning of the scales, the reading means comprising
 (1) a multi-line detector adapted optoelectronically to scan the absolutely coded scale and entirely to read one of the code words in any angular position of the detector relative to the encoder disk,
(b) illuminating means energizable to emit a light flash illuminating the absolutely coded scale, and
(c) evaluating means for processing the position-dependent signals, said evaluating means being operable to derive an instantaneous position of the encoder disk from the position-dependent signals, to determine absolute positions of the encoder disk in response to the scanning of the absolutely coded scale during the light flashes and to store the absolute positions and, upon rotation of the encoder disk from one of the absolute positions, to determine the angular position of the encoder disk with reference to the one absolute position in response to the scanning of the incremental scale, and said evaluating means comprises
 (1) counting means operable independently of an external power source and adapted to indicate the number of revolutions performed by the encoder disk.

2. The angle encoder of claim 1, comprising a second rotatably mounted encoder disk comprising a second incremental scale extending on a first circular track and comprising increments having radial boundaries, and a second absolutely coded scale extending on a second circular track radially spaced from the first track and comprising a serial bar code having radial side edges radially aligned with said radial boundaries and representing multi-digit code words corresponding to absolute positions of the second encoder disk, a speed-reducing transmission operatively interconnecting the encoder disks, the reading means comprises a second multi-line detector adapted optoelectronically to scan the second absolutely coded scale and entirely to read one of the code words in any angular position of the second detector relative to the second encoder disk, and the illuminating means is energizable to emit a light flash illuminating the first and the second absolutely coded scales at the same time.

3. The angle encoder of claim 2, further comprising drive means operable to rotate the first encoder disk and operatively connected by the transmission to the second encoder disk.

4. The angle encoder of claim 1, wherein the counting means comprises a bidirectional counter, further comprising an exciting device carried by the encoder disk and operable to actuate the counter in a sense depending on the sense of rotation of the encoder disk.

5. The angle encoder of claim 4, wherein the counting means comprises a counting circuit powered by a mains-independent power source and a receiver for generating electric pulses in response to the exciting device passing the receiver upon rotation of the encoder disk, the receiver being adapted to generate the electric pulses without an extraneous power source and to deliver the pulses to the counting circuit.

6. The angle encoder of claim 5, wherein the exciting device comprises at least one exciting magnet and the receiver is a Wiegand receiver.

7. The angle recorder of claim 6, wherein the exciting device comprises two peripherally spaced apart exciting magnets.

* * * * *